(12) United States Patent
Wohlfarth et al.

(10) Patent No.: US 9,154,047 B2
(45) Date of Patent: Oct. 6, 2015

(54) RECTIFIER SYSTEM FOR A GENERATOR

(75) Inventors: Michael Wohlfarth, Gerlingen (DE);
Alfred Goerlach, Kusterdingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 355 days.

(21) Appl. No.: 13/388,650

(22) PCT Filed: Jun. 9, 2010

(86) PCT No.: PCT/EP2010/058081
§ 371 (c)(1),
(2), (4) Date: Apr. 12, 2012

(87) PCT Pub. No.: WO2011/015396
PCT Pub. Date: Feb. 10, 2011

(65) Prior Publication Data
US 2012/0188810 A1    Jul. 26, 2012

(30) Foreign Application Priority Data
Aug. 5, 2009   (DE) .......................... 10 2009 028 246

(51) Int. Cl.
*H02M 7/06* (2006.01)
*H02M 7/00* (2006.01)

(52) U.S. Cl.
CPC ...................................... *H02M 7/06* (2013.01)

(58) Field of Classification Search
CPC ..... H02M 7/06; H02M 7/5387; H02M 7/062; H02M 7/217; H01L 29/872; H01L 29/8725; H02K 11/046; H02K 11/048

USPC ................................................... 363/125–126
See application file for complete search history.

(56) References Cited

U.S. PATENT DOCUMENTS

| | | | |
|---|---|---|---|
| 5,365,102 A | 11/1994 | Mehrotra et al. | |
| 5,608,616 A | 3/1997 | Umeda et al. | |
| 5,780,996 A | 7/1998 | Kusase et al. | |
| 7,084,610 B2 | 8/2006 | Chen | |
| 7,236,380 B1* | 6/2007 | Spitz et al. | 363/45 |
| 2008/0122323 A1* | 5/2008 | Spitz et al. | 310/68 D |
| 2009/0179264 A1 | 7/2009 | Korec et al. | |

FOREIGN PATENT DOCUMENTS

| | | |
|---|---|---|
| DE | 103 17 525 | 11/2004 |
| DE | 10 2004 053 761 | 5/2006 |

(Continued)

OTHER PUBLICATIONS

S. M. Sze, "Physics of Semiconductor Devices," John Wiley & Sons, New York, 1981, p. 91.

(Continued)

*Primary Examiner* — Adolf Berhane
*Assistant Examiner* — Henry Lee, III
(74) *Attorney, Agent, or Firm* — Kenyon & Kenyon LLP

(57) ABSTRACT

A rectifier system, e.g., for a generator, includes a bridge system having a predefined number of rectifier elements, at least one rectifier element being a rectifier element having at least one reverse-voltage dependent characteristic curve in a predefined range, and one of the negative diodes having a higher reverse saturation current than the associated positive diode, and at least one of the negative diodes being placed at a location in the rectifier in which the temperature is increased.

13 Claims, 2 Drawing Sheets

(56) References Cited

FOREIGN PATENT DOCUMENTS

| | | |
|---|---|---|
| DE | 10 2004 056 663 | 6/2006 |
| DE | 10 2008 055 052 | 7/2009 |
| JP | 58218873 | 12/1983 |
| JP | H099522 | 1/1997 |
| JP | 2008519448 | 6/2008 |
| WO | WO 2011/007073 | 1/2011 |

OTHER PUBLICATIONS

Chen, Max et al.: High-Voltage TBS Diodes Challenge Planar Schottkys.ImPower Electronics Technology, Oct. 1, 2006.

Mehrotra, M., Bauga, B. J.: The Trench Mos Barrier Schottky(TMBS), RectJfier.tn:IEDM, TechnicalDJQest, International, Dec. 5-8, 1993, pp. 675-678.

Ned Mohan, Tore M. Uneland, William P. Robbins: "Power Electronics, Converters, Applications and Design—Third Edition," 2003, John Wiley & Sons, Inc., U.S.A., XP002622055K, pp. 16-17.

Sakai, T. et al.: "Experimental Investigation of Dependence of Electrical Characteristics on Device Parameters in Trench Mos Barrier Schottkydiodes," Proceedings of the 10th International Symposium on Power Semiconductor Devices & IC's. ISPSD '98. Kyoto, Jun. 3-6, 1998, pp. 293-296, XP0000801083.

\* cited by examiner

RECTIFIER SYSTEM FOR A GENERATOR

BACKGROUND OF THE INVENTION

1. Field of the Invention

The present invention relates to a rectifier system for a generator of a motor vehicle.

2. Description of Related Art

In the case of three-phase generators or alternators in motor vehicles in particular, B6 a.c. bridges are usually used as rectifiers. In this connection, 6 pn-semiconductor diodes made from silicon are used as rectifying elements. FIG. 1 shows an example of such a system.

Occasionally, a.c. bridges having more than 6 diodes are also used. For example, bridges having diodes connected in parallel are used in the case of very high currents. A possible system is shown as a circuit diagram in FIG. 2.

The semiconductor diodes are usually designed as Zener diodes. This case is assumed for the two depictions in the circuit diagram. In addition to a three-phase generator and the a.c. bridge, a complete generator system also includes a voltage regulator which ensures that the rectified voltage has a specific value, for example, 14.3 V. The voltage regulator controls the excitation current of the generator. If the generator voltage exceeds the intended value, the regulator interrupts the excitation current. The excitation becomes weaker and the generator voltage drops. If the generator voltage drops below a lower setpoint value, the regulator switches the excitation current on again. The excitation current is fed to the excitation winding of the generator via sliprings. Generators having multifunction regulators draw the excitation current directly from positive terminal B+. The elements of the voltage regulator are mostly integrated monolithically into silicon.

In the starting case, the regulator switches on a pre-excitation current supplied by the battery. As soon as the generator's rotor rotates, the regulator detects a voltage signal Up on a phase connection. From its frequency, the regulator is able to derive the generator speed. When a set switch-on speed is reached, the regulator switches on the full excitation current, so that the generator begins to deliver current.

In order for the voltage regulator to detect the speed of the rotor, the alternating current portion of phase signal Up_AC must have a specific minimum voltage. In addition, direct current portion Up_DC of the phase signal may usually not exceed a certain threshold, since the evaluation circuit of the regulator frequently functions only up to a specific voltage value. Thus, minimally necessary phase alternating voltage Up_AC may be, for example, 3 volts, measured from peak to peak, and maximally occurring direct current portion Up_DC may be 8 volts.

During the pre-excitation clocking, if the generator is not yet delivering current into the electrical system, or if no rectification is taking place yet, the direct current value and the alternating voltage value of the phase voltage are influenced by the reverse currents of the rectifier diodes. In this operating state, battery voltage UB is present at terminal B+. If the same reverse currents flow through the diodes (series connection), phase voltage Up_DC=UB/2.

In this connection, it was assumed that the internal resistance of the regulator between the phase tap and ground is infinite. This is ordinarily not the case, but instead the regulator has a resistance of, for example, 1-100 kΩ between the phase tap and ground. This resistor is, for example, connected to diode D3 in parallel in the example according to FIG. 1. However, its influence will be disregarded from further consideration for reasons of clarity. The curve of reverse current IR of a pn-type diode made of silicon is extremely temperature-dependent and increases as the reverse voltage rises. Greater detail in this regard may be found in S. M. Sze, "Physics of Semiconductor Devices," John Wiley & Sons, New York, 1981, p. 91. This is also shown in FIG. 3.

Since positive and negative diodes are each connected in series, phase voltage Up_DC changes if the positive and negative diodes are located at positions of varying temperature. In the case of high reverse currents of the positive diode, direct current portion Up_DC of the phase voltage may assume values above the maximum permissible threshold in the extreme case. The result of this is that the regulator does not detect the start speed or detects it too late and does not activate the generator or activates it only at higher speeds.

A disadvantage is that varying reverse currents of the pn-type diodes, caused, for example, by varying diode temperatures, may cause direct current portion Up_DC of the phase voltage to exceed the maximum permissible value and that the starting behavior of the generator is no longer ensured.

A generator system for a vehicle is known from U.S. Pat. No. 7,084,610 B2, in which a B6 bridge made up of Schottky diodes is used as a rectifier bridge. A Zener diode connected in the reverse direction is used for voltage limitation. It thus limits the operating voltage in relation to interferences and interference impulses originating from the generator.

BRIEF SUMMARY OF THE INVENTION

The present invention has the advantage that the deficiencies of the related art described above are eliminated. In this connection, the object according to the present invention may ensure that the direct current portion of phase voltage Up_DC is reliably held at a low voltage value.

If instead of p-n rectifier diodes, rectifying elements are used whose reverse current shows practically no dependence on the reverse voltage in the range of voltages below battery voltage UB, a suitable design of the rectifier may ensure that the direct current phase voltage reliably remains below a certain threshold during the regulator's pre-excitation clocking. Suggested in particular as rectifying elements are novel Schottky diodes in which it is possible to largely suppress the voltage-dependent portion of the reverse current. The reverse saturation current is constant. Examples are trench MOS barrier junction diodes (TMBS diodes) or trench junction barrier Schottky diodes (TJBS).

DETAILED DESCRIPTION OF THE INVENTION

Figure 3:
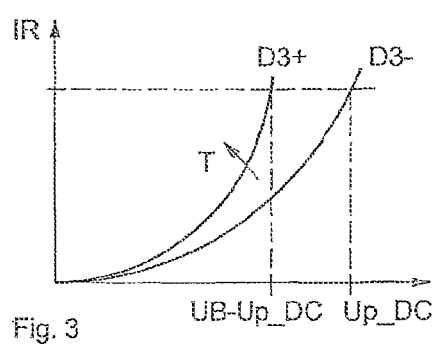
FIG. 3 shows typical reverse characteristic curves of pn-type diodes. In this connection, diode D3+ is located at a higher temperature than diode D3− or has a higher reverse current resulting from the process of design or manufacturing.
Figure 4:
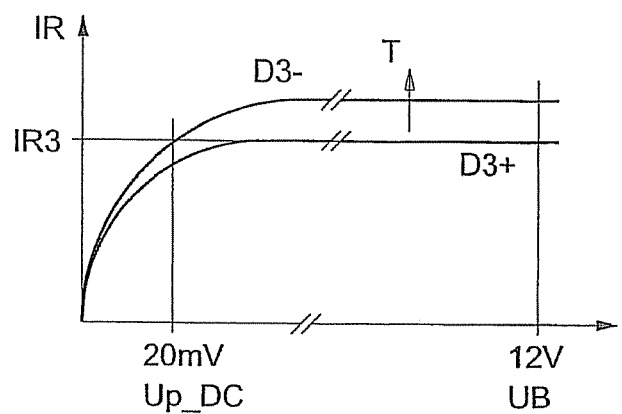
FIG. 4 shows typical reverse characteristic curves of rectifier elements according to the present invention having a voltage-independent reverse saturation current. Element D3− has a higher reverse current than D3+. Negligibly small phase voltage Up_DC in the case of a series connection of the voltage-independent elements between the battery having a battery voltage UB and ground is also plotted.

A current-voltage characteristic of a reverse voltage-independent rectifier element according to the present invention similar to FIG. 3 is shown schematically in FIG. 4. It is apparent that when two such elements are connected in series, battery voltage UB drops almost completely via the element having the lower reverse current, since approximately the same current I3 flows through both diodes.

Figure 1:
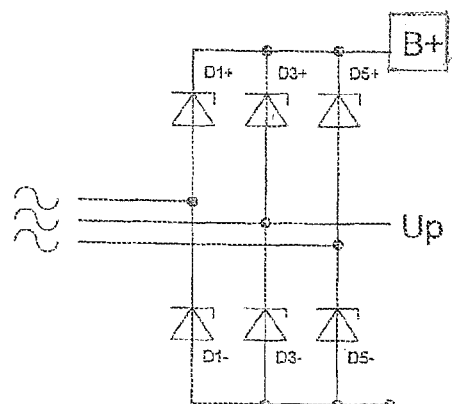
FIG. 1 shows a circuit diagram of a B6 bridge rectifier system.
Figure 2:
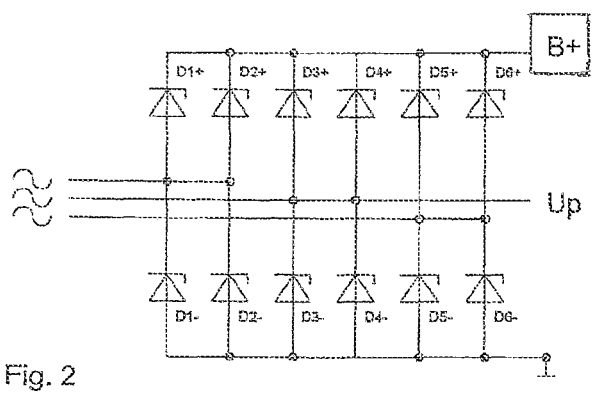
FIG. 2 shows a circuit diagram of a B6 bridge rectifier system having diodes connected in parallel.

In a first exemplary embodiment, TMBS diodes are used in a rectifier system according to FIG. 1 or FIG. 2, at least positive diodes D3+, preferably, however, all positive diodes D1+ through D6+, having a significantly lower reverse saturation current than negative diode D3−, or all negative diodes D1− through D6−. As a consequence of the lower reverse current of the positive diodes, it is not possible to achieve the diode reverse saturation current in the negative diodes when positive and negative diodes are connected in series according to FIG. 1 or FIG. 2. The voltage drop on the negative diodes remains low. Thus the direct current portion of phase signal Up_DC is very small.

In another exemplary embodiment, rectifying elements having a voltage-independent reverse saturation current, for example, TMBS diodes, are used in a rectifier system; however, the thermal design of the rectifier is implemented in such a way that the negative diodes are preferably applied to the hot areas of the rectifier. Since the reverse saturation current increases with the temperature, the reverse saturation current of the negative diodes is further increased and thus phase voltage Up_DC is reliably kept at low values.

Figure 5:
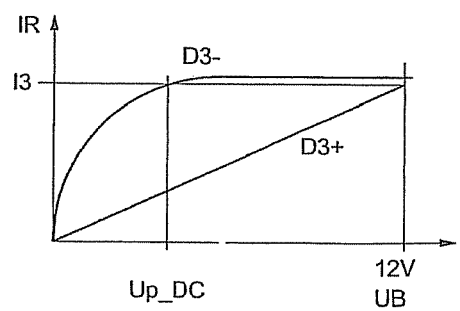
FIG. 5 shows typical reverse characteristic curves in the rectifier in the case of a combination of pn-type diodes and of rectifier elements according to the present invention having a voltage-independent reverse saturation current. Element D3− has a higher reverse current in the entire voltage range from 0 V to UB than pn-type diode D3+. Negligibly small phase voltage Up_DC in the case of a series connection of the voltage-independent elements between the battery having a battery voltage UB and ground is also plotted.

In a third exemplary embodiment, pn-type diodes are combined with rectifying elements having a voltage-independent reverse current, such as, for example, TMBS diodes. In this connection, the negative diodes of a rectifier according to FIG. 1 or FIG. 2 are equipped with TMBS diodes and the positive diodes are equipped with conventional pn-type diodes. The reverse currents of TMBS and pn-type diodes are selected in such a way that the reverse saturation current of the TMBS diodes is higher than the reverse current of the pn-type diodes for all diode temperatures occurring in the range 0 V to UB. This is illustrated in FIG. 5.

In a fourth exemplary embodiment, at least one of the diode pairs connected in parallel is replaced by a parallel connection of a pn-type and a TMBS diode in a rectifier according to FIG. 2 which contains TMBS diodes connected in parallel. In this connection, the reverse currents of the elements of the TMBS and pn-type diodes connected in parallel are again selected in such a way that the reverse saturation current of the TMBS diodes is higher than the reverse current of the pn-type diodes for all diode temperatures occurring in the range 0 V to UB. The rectifier is designed in such a way that negative diodes are selected for the diode pair having pn-type and TMBS diodes connected in parallel and that the associated positive diodes have a lower reverse current.

What is claimed is:

1. A rectifier system for a generator, comprising:
a plurality of rectifier elements configured in a bridge system, wherein at least one of the plurality of rectifier elements is a rectifier element having at least one voltage-independent reverse saturation current characteristic curve in a predefined range, wherein there is at least one positive rectifier element and at least one negative rectifier element for which the reverse current is higher for the at least one negative rectifier element than the at least one positive rectifier element;
wherein the plurality of rectifier elements having a voltage-independent reverse saturation, include at least one TMBS diode or TJBS diode, and wherein the negative diodes are applied to higher temperature areas of the rectifier, so that as the reverse saturation current increases with increasing operating or environmental temperature, the reverse saturation current of the negative diodes is further increased and a phase voltage is kept at low values.

2. The rectifier system as recited in claim 1, wherein the plurality of rectifier elements include positive and negative diodes.

3. The rectifier system as recited in claim 2, wherein at least one of the negative diodes has a higher reverse saturation current than an associated positive diode.

4. The rectifier system as recited in claim 2, wherein at least one of the negative diodes is placed at a location in the rectifier system in which a temperature is increased.

5. The rectifier system as recited in claim 2, wherein at least one of the positive diodes is replaced by a pn-type diode.

6. The rectifier system as recited in claim 2, wherein at least one of the plurality of rectifier elements includes a parallel connection of two component rectifier elements, and wherein at least one of the two component rectifier elements connected in parallel is made up of a combination of a pn-type diode with a rectifier element having a reverse-voltage-independent characteristic curve.

7. The rectifier system as recited in claim 2, wherein a TMBS diode is used as the rectifier element having the at least one reverse-voltage-independent characteristic curve.

8. The rectifier system as recited in claim 2, wherein a TJBS diode is used as the rectifier element having the at least one reverse-voltage-independent characteristic curve.

9. The rectifier system as recited in claim 2, wherein the rectifier element having the at least one reverse-voltage-independent characteristic curve is implemented by an electronic circuit.

10. The rectifier system as recited in claim 1, wherein there is a negligibly small phase voltage for a series connection of voltage-independent rectifier elements between a battery having a battery voltage with respect to a ground.

11. The rectifier system as recited in claim 2, wherein there is a negligibly small phase voltage for a series connection of voltage-independent rectifier elements between a battery having a battery voltage with respect to a ground.

12. A rectifier system for a generator, comprising:
a plurality of rectifier elements configured in a bridge system, wherein at least one of the plurality of rectifier elements is a rectifier element having at least one voltage-independent reverse saturation current characteristic curve in a predefined range, wherein there is at least one positive rectifier element and at least one negative rectifier element for which the reverse current is higher for the at least one negative rectifier element than the at least one positive rectifier element;
wherein there are pn-type diodes and the plurality of rectifier elements having a voltage-independent reverse current, including at least one TMBS diode or TJBS diode, wherein the negative diodes include the at least one TMBS diode or TJBS diode and the positive diodes include the pn-type diodes, and wherein the reverse currents of the TMBS diode or TJBS diode and the pn-type diodes are selected so that the reverse saturation current of the TMBS diode or TJBS diode is higher than the reverse current of the pn-type diodes for diode temperatures occurring in a voltage range of 0 V to an upper voltage.

13. A rectifier system for a generator, comprising:

a plurality of rectifier elements configured in a bridge system, wherein at least one of the plurality of rectifier elements is a rectifier element having at least one voltage-independent reverse saturation current characteristic curve in a predefined range, wherein there is at least one positive rectifier element and at least one negative rectifier element for which the reverse current is higher for the at least one negative rectifier element than the at least one positive rectifier element;

wherein at least one of the diode pairs connected in parallel includes a parallel connection of a pn-type diode and at least one TMBS diode or TJBS diode, wherein the reverse currents of the at least one TMBS diode or TJBS diode and the pn-type diodes connected in parallel are selected so that the reverse saturation current of the at least one TMBS diode or TJBS diode is higher than the reverse current of the pn-type diodes for diode temperatures occurring in a voltage range of 0 V to an upper voltage, and wherein the negative diodes are selected for a diode pair having a pn-type diode and a TMBS diode or TJBS diode connected in parallel and in which associated positive diodes have a lower reverse current.

* * * * *